United States Patent [19]

Hockaday

[11] Patent Number: 5,028,106
[45] Date of Patent: Jul. 2, 1991

[54] ENVIRONMENTALLY STABLE INTEGRATED OPTIC CHIP MOUNT

[75] Inventor: Bruce D. Hockaday, Vernon, Conn.

[73] Assignee: United Technologies Corporation, Hartford, Conn.

[21] Appl. No.: 586,841

[22] Filed: Sep. 24, 1990

[51] Int. Cl.$^5$ .............................................. G02B 6/12
[52] U.S. Cl. .................................................. 350/96.11
[58] Field of Search ........................... 350/96.11, 96.34

*Primary Examiner*—William L. Sikes
*Assistant Examiner*—Robert E. Wise
*Attorney, Agent, or Firm*—Richard H. Kosakowski

[57] ABSTRACT

A wedge-shaped block of pyrolytic graphite or other suitable anisotropic material cut along certain predetermined angular dimensions is used as a thermal expansion coefficient transformer to match the anisotropic thermal expansion coefficients of a lithium niobate or lithium tantalate IO chip to an isotropic substrate material such as 316 stainless steel or aluminum, or to match the isotropic thermal expansion coefficients of a silicon IO chip to an isotropic substrate material, the wedge being used as an intermediate block mounted between the IO chip and the substrate, the anisotropic material used as the thermal transformer having a thermal expansion coefficient which is greater than the value of the thermal expansion coefficient of the IO chip material in one direction, and having a thermal expansion coefficient which is lesser than the thermal expansion coefficient of the IO chip material in another direction.

40 Claims, 2 Drawing Sheets

ENVIRONMENTALLY STABLE INTEGRATED OPTIC CHIP MOUNT

DESCRIPTION

1. Technical Field

This invention relates to integrated optics, and more particularly to an environmentally stable mounting system for an integrated optic chip.

2. Background Art

Integrated optic (IO) chips fabricated from X-cut lithium niobate have two different thermal expansion coefficients in the plane of the device and, subsequently, in the surface of the chip which is mounted to a substrate. These expansion coefficients are $15.4 \times 10^{-6}/°C$. in the X and Y directions, and $7.5 \times 10^{-6}/°C$. in the Z direction. The anisotropic thermal expansion of lithium niobate creates a difficult mounting problem, so far as producing an exact thermal expansion match between the chip and the substrate. A poor thermal expansion match between the chip and substrate will produce excessive stress gradients in the bonding material, initiating bond line failures as well as inducing stress in the lithium niobate. The stress changes the optical properties of the lithium niobate and may cause cracking of the chip at extreme temperatures.

The prior art is limited to use of a substrate that matches the average thermal expansion coefficient of the lithium niobate. The prior art has also been limited to laboratory applications where the environmental extremes are limited.

DISCLOSURE OF INVENTION

Objects of the present invention include the provision of a wedge of anisotropic material which matches the anisotropic thermal expansion coefficients of a lithium niobate or lithium tantalate IO chip to a substrate, typically an isotropic substrate. Further objects include the provision of a wedge of anisotropic material which matches the isotropic thermal expansion coefficients of a silicon IO chip to a substrate, typically an isotropic substrate.

According to a first aspect of the present invention, a wedge-shaped block of pyrolytic graphite or other suitable anisotropic material cut along certain predetermined angular dimensions is used as a thermal expansion coefficient transformer to match the anisotropic thermal expansion coefficients of a lithium niobate or lithium tantalate IO chip to an isotropic substrate material such as 316 stainless steel or aluminum, the wedge being mounted between the IO chip and the substrate, the anisotropic material used as the thermal transformer having a thermal expansion coefficient which is greater than the value of the thermal expansion coefficient of the IO chip material in one direction, and having a thermal expansion coefficient which is lesser than the value of the thermal expansion coefficient of the IO chip material in another direction.

According to a second aspect of the present invention, a wedge-shaped block of pyrolytic graphite or other suitable anisotropic material cut along certain predetermined angular dimensions is used as a thermal expansion coefficient transformer to match the isotropic thermal expansion coefficients of a silicon IO chip to an isotropic substrate material such as 316 stainless steel or aluminum, the wedge being mounted between the IO chip and the substrate, the anisotropic material used as the thermal transformer having a thermal expansion coefficient which is greater than the value of the thermal expansion coefficient of the IO chip material in one direction, and having a thermal expansion coefficient which is lesser than the value of the thermal expansion coefficient of the IO chip material in another direction.

The invention exactly matches the thermal expansion coefficients of the lithium niobate, lithium tantalate, or silicon and the substrate material by the use of the wedge which serves as a thermal expansion coefficient transformer. This thermal coefficient matching device makes possible an IO chip mounting system that will exceed the $-55°$ to $+125°$ C. environment typically required for electronic devices.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
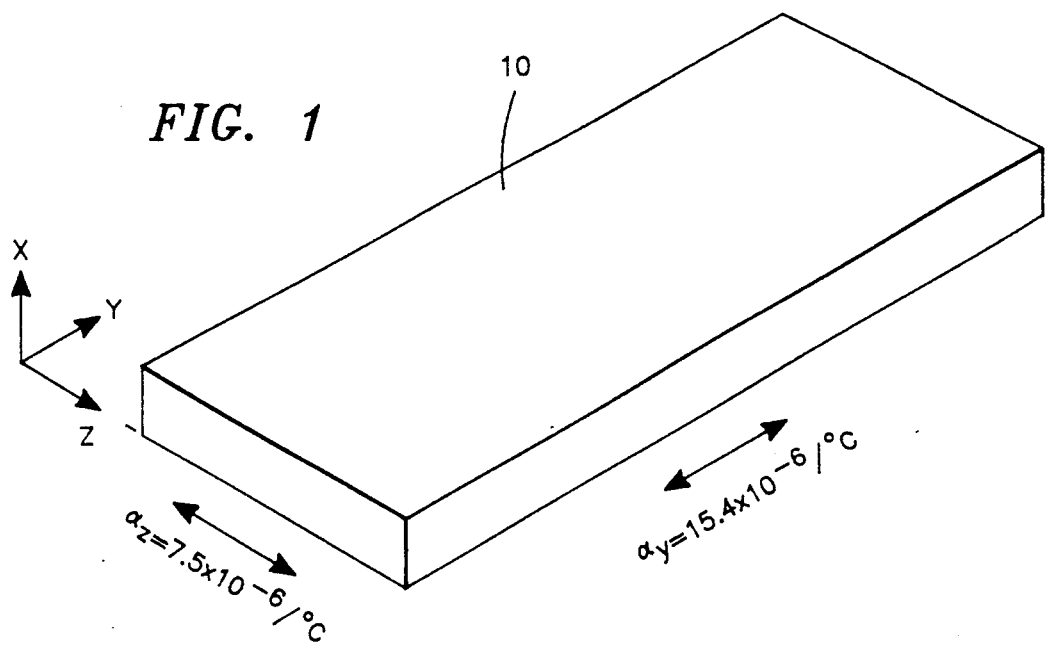
FIG. 1 is a perspective illustration of an IO chip.

FIG. 1 is a perspective illustration of an integrated optic (IO) chip 10 fabricated from X-cut lithium niobate. Lithium niobate is an orientation dependent (anisotropic) device that has different thermal expansion coefficients in two different directions, e.g., along the X,Y axes, and Z axis, respectively. The coefficients, $\alpha_x$ and $\alpha_y$, in the X and Y directions are $15.4 \times 10^{-6}/°C$., while the coefficient, $\alpha_z$, in the Z direction is $7.5 \times 10^{-6}/°C$.

Figure 2:
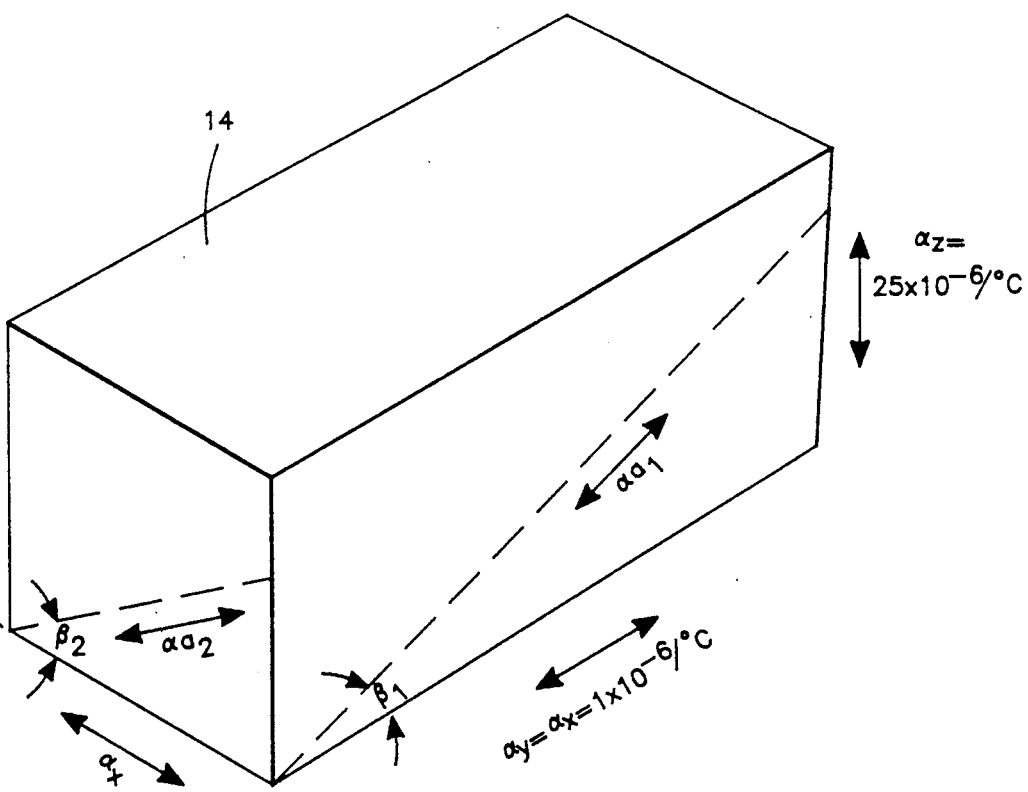
FIG. 2 is a perspective illustration of a block of anisotropic material.

FIG. 2 is a perspective illustration of a block 14 of pyrolytic graphite from which the thermal expansion coefficient transformer of the present invention is cut. As seen in greater detail with respect to FIG. 3, the transformer is cut in the shape of a wedge 18. The pyrolytic graphite's anisotropic thermal expansion coefficients are $1 \times 10^{-6}/°C$. in both the X and Y directions $(\alpha_x, \alpha_y)$, and $25 \times 10^{-6}/°C$. in the Z direction $(\alpha_z)$.

The mounting system in accordance with the present invention employs a wedge 18 of pyrolytic graphite as an intermediate block that is mounted between the lithium niobate and the substrate material 20 (FIG. 4) of choice. In the best mode embodiment of the present invention, the substrate material 20 is 316 stainless steel. However, other isotropic materials such as aluminum may be used if desired. By cutting the pyrolytic graphite at specific angles into a wedge, the anisotropic nature of the pyrolytic graphite adjusts the thermal expansion coefficient of the wedge's resulting mounting surfaces 22, 24 to match the thermal expansion coefficients of both the lithium niobate IO chip and the substrate.

The pyrolytic graphite has both higher and lower in magnitude thermal expansion coefficients as compared to the lithium niobate (i.e., higher than the value of the thermal expansion coefficient in the Z direction and lower than the value of the thermal expansion coefficient in the X,Y directions). Thus, the graphite can be cut at an angle of beta₁ ($\beta_1$) in the Y/Z plane to produce an apparent thermal expansion coefficient, $\alpha_{a1}$, along the resulting inclined plane, as described by Eq. 1 and illustrated in FIG. 2.

$$\alpha_{a1} = [(\alpha_z \cdot \sin \beta_1)^2 + (\alpha_y \cdot \cos \beta_1)^2]^{\frac{1}{2}} \quad \text{(Eq. 1)}$$

Figure 3:
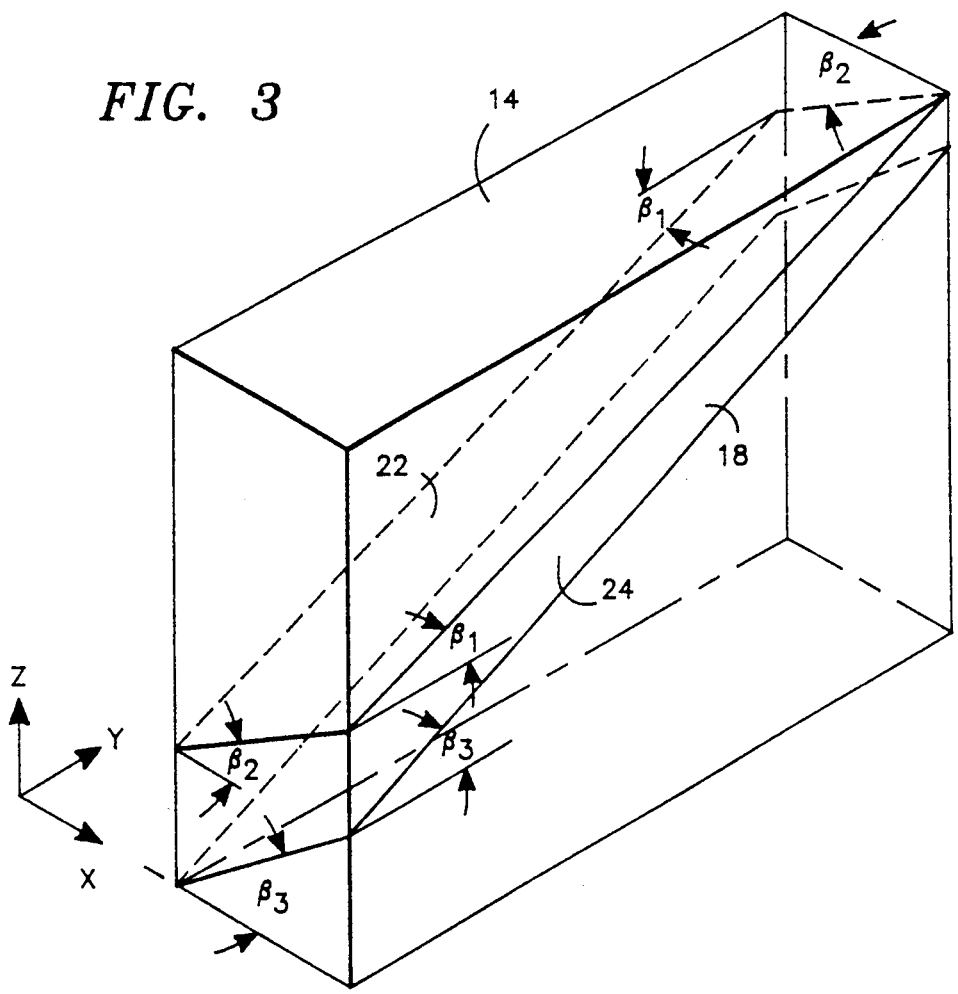
FIG. 3 is a perspective illustration of the block of FIG. 2 from which the thermal coefficient transformer wedge of the present invention is fabricated.

As illustrated in FIG. 3, this angled cut technique is applied to the top of the block of pyrolytic graphite of FIG. 2, to achieve the appropriate angled dimensions of the wedge. By solving Eq. 1 for $\beta_1$, the resulting wedge angle is 38.0 degrees in the Y/Z plane.

In a similar manner, the graphite can also be cut at an angle of beta₂ ($\beta_2$) in the X/Z plane to produce the apparent thermal expansion coefficient, $\alpha_{a2}$, along the resulting inclined plane, as described by Eq. 2 and illustrated in FIG. 2.

$$\alpha_{a2} = [(\alpha_z \cdot \sin \beta_2)^2 + (\alpha_x \cdot \cos \beta_2)^2]^{\frac{1}{2}} \quad \text{(Eq. 2)}$$

By solving Eq. 2 for $\beta_2$, the resulting wedge angle is 17.3 degrees in the X/Z plane. The two angled cuts result in the graphite block's top surface having two different thermal expansion coefficients which exactly match the thermal expansion coefficients of the lithium niobate.

The 316 stainless steel substrate material is isotropic in nature and has a thermal expansion coefficient of $16.2 \times 10^{-6}$/ °C. Equations 1 and 2 are used to determine the resulting angled cut, $\beta_3$, to the block of graphite to match the thermal expansion coefficients of the graphite and the 316 stainless steel. The resulting value of $\beta_3$ is 40.4 degrees.

Figure 4:
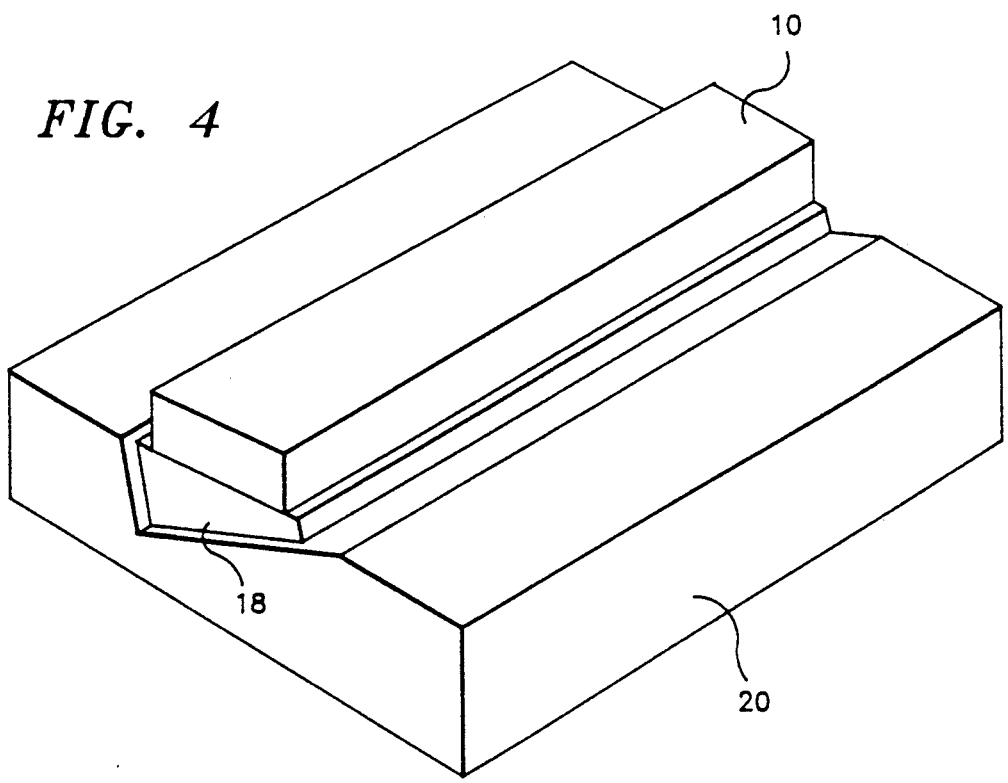
FIG. 4 is a perspective illustration of the wedge of FIG. 3 between the IO chip of FIG. 1 and a substrate material.

FIG. 4 is a perspective illustration of the wedge 18 of FIG. 3 sandwiched between the lithium niobate IO chip 10 of FIG. 1 and the substrate material 20.

As described hereinbefore, the material used for the thermal matching transformer is pyrolytic graphite. However, it is to be understood that other materials may be used without deviating from the broadest scope of the present invention. These alternative materials include calcite, which has thermal expansion coefficients of $25 \times 10^{-6}$/ °C. in the X and Y directions, and $-5.8 \times 10^{-6}$/ °C. in the Z direction. Other anisotropic materials which may be used in different applications include crystal quartz or barium titanate. It suffice for the present invention that the thermal matching material chosen have a thermal expansion coefficient which is greater than the value of the thermal expansion coefficient of the IO chip material in one direction, and have a thermal expansion coefficient which is lesser than the value of the thermal expansion coefficient of the IO chip material in another direction.

Also, the IO chip material has been described as comprising lithium niobate. However, other suitable materials may be used if desired, such as lithium tantalate, which has a thermal expansion coefficient of $16.1 \times 10^{-6}$/ °C. in a first direction, and a thermal expansion coefficient of $4.1 \times 10^{-6}$/ °C. in a second direction.

Further, the IO chip material has been described as being anisotropic in nature. However, in accordance with a second aspect of the present invention, it is to be understood that the IO chip material may have isotropic thermal expansion coefficients. An example of such material is silicon which has an isotropic thermal expansion coefficient of $2.6 \times 10^{-6}$/ °C. Thus, FIG. 1 may be interpreted to represent silicon having equal thermal expansion coefficients $\alpha_x$, $\alpha_y$ and $\alpha_z$ in the X, Y and Z directions, respectively. It follows that Equations 1 and 2 are used to determine the resulting angles $\beta_1$, $\beta_2$, and $\beta_3$, at which the block of anisotropic material of FIG. 2 is cut to match the isotropic thermal expansion coefficients of the silicon IO chip to the graphite, and to match the anisotropic thermal expansion coefficients of the graphite to the substrate.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

I claim:

1. Apparatus, comprising:
    a block of integrated optic chip material having anisotropic thermal expansion coefficients along two different axes;
    a block of isotropic substrate material; and
    a wedge of anisotropic material having anisotropic thermal expansion coefficients along two different axes, said anisotropic material having a thermal expansion coefficient in a first direction which is greater than a value of the thermal expansion coefficient of said chip material in a corresponding first direction, and having a thermal expansion coefficient in a second direction which is lesser than a value of the thermal expansion coefficient of said chip material in a corresponding second direction,
    said wedge of anisotropic material having predetermined angular dimensions such that a first surface of said wedge of anisotropic material has anisotropic thermal expansion coefficients which match the magnitude and direction of the anisotropic thermal expansion coefficients of said chip material, and such that a second surface of said wedge of anisotropic material has isotropic thermal expansion coefficients which match the magnitude of the isotropic thermal expansion coefficients of said substrate material,
    said wedge of anisotropic material disposed between said block of chip material and said block of substrate material such that said first surface of said wedge of anisotropic material contacts said chip material and such that said second surface of said wedge of anisotropic material contacts said block of substrate material.

2. The apparatus of claim 1, wherein said integrated optic chip material is lithium niobate.

3. The apparatus of claim 2, wherein said lithium niobate has a thermal expansion coefficient of $15.4 \times 10^{-6}$/ °C. in said first direction, and has a thermal expansion coefficient of $7.5 \times 10^{-6}$/ °C. in said second direction.

4. The apparatus of claim 1, wherein said integrated optic chip material is lithium tantalate.

5. The apparatus of claim 4, wherein said lithium tantalate has a thermal expansion coefficient of $16.1 \times 10^{-6}$/ °C. in said first direction, and has a thermal expansion coefficient of $4.1 \times 10^{-6}$/ °C. in said second direction.

6. The apparatus of claim 1, wherein said anisotropic material is pyrolytic graphite.

7. The apparatus of claim 6, wherein said pyrolytic graphite has a thermal expansion coefficient of $1 \times 10^{-6}/$ °C. in said first direction, and has a thermal expansion coefficient of $25 \times 10^{-6}/$ °C. in said second direction.

8. The apparatus of claim 1, wherein said anisotropic material is calcite.

9. The apparatus of claim 8, wherein said calcite has a thermal expansion coefficient of $25 \times 10^{-6}/$ °C. in said first direction, and has a thermal expansion coefficient of $-5.8 \times 10^{-6}/$ °C. in said second direction.

10. The apparatus of claim 1, wherein said anisotropic material is crystal quartz.

11. The apparatus of claim 1, wherein said anisotropic material is barium titanate.

12. Apparatus for interfacing a block of integrated optic chip material having anisotropic thermal expansion coefficients along two different axes to a block of substrate material having isotropic thermal expansion coefficients, comprising:
    a wedge of anisotropic material having anisotropic thermal expansion coefficients along two different axes, said anisotropic material having a thermal expansion coefficient in a first direction which is greater than a value of the thermal expansion coefficient of said chip material in a corresponding first direction, and having a thermal expansion coefficient in a second direction which is lesser than a value of the thermal expansion coefficient of said chip material in a corresponding second direction,
    said wedge of anisotropic material having predetermined angular dimensions such that a first surface of said wedge of anisotropic material has anisotropic thermal expansion coefficients which match the magnitude and direction of the anisotropic thermal expansion coefficients of said chip material, and such that a second surface of said wedge of anisotropic material has isotropic thermal expansion coefficients which match the magnitude of the isotropic thermal expansion coefficients of said substrate material,
    said wedge of anisotropic material disposed between said block of chip material and said block of substrate material such that said first surface of said wedge of anisotropic material contacts said chip material and such that said second surface of said wedge of anisotropic material contacts said block of substrate material.

13. The apparatus of claim 12, wherein said integrated optic chip material is lithium niobate.

14. The apparatus of claim 13, wherein said lithium niobate has a thermal expansion coefficient of $15.4 \times 10^{-6}/$ °C. in said first direction, and has a thermal expansion coefficient of $7.5 \times 10^{-6}/$ °C. in said second direction.

15. The apparatus of claim 12, wherein said integrated optic chip material is lithium tantalate.

16. The apparatus of claim 15, wherein said lithium tantalate has a thermal expansion coefficient of $16.1 \times 10^{-6}/$ °C. in said first direction, and has a thermal expansion coefficient of $4.1 \times 10^{-6}/$ °C. in said second direction.

17. The apparatus of claim 12 wherein said anisotropic material is pyrolytic graphite.

18. The apparatus of claim 17, wherein said pyrolytic graphite has a thermal expansion coefficient of $1 \times 10^{-6}/$ °C. in said first direction, and has a thermal expansion coefficient of $25 \times 10^{-6}/$ °C. in said second direction.

19. The apparatus of claim 12, wherein said anisotropic material is calcite.

20. The apparatus of claim 19, wherein said calcite has a thermal expansion coefficient of $25 \times 10^{-6}/$ °C. in said first direction, and has a thermal expansion coefficient of $-5.8 \times 10^{-6}/$ °C. in said second direction.

21. The apparatus of claim 12, wherein said anisotropic material is crystal quartz.

22. The apparatus of claim 12, wherein said anisotropic material is barium titanate.

23. Apparatus, comprising:
    a block of integrated optic chip material having isotropic thermal expansion coefficients along all axes;
    a block of isotropic substrate material; and
    a wedge of anisotropic material having anisotropic thermal expansion coefficients along two different axes, said anisotropic material having a thermal expansion coefficient in a first direction which is greater than a value of the thermal expansion coefficient of said chip material in a corresponding first direction, and having a thermal expansion coefficient in a second direction which is lesser than a value of the thermal expansion coefficient of said chip material in a corresponding second direction,
    said wedge of anisotropic material having predetermined angular dimensions such that a first surface of said wedge of anisotropic material has isotropic thermal expansion coefficients which match the magnitude of the isotropic thermal expansion coefficients of said chip material, and such that a second surface of said wedge of anisotropic material has isotropic thermal expansion coefficients which match the magnitude of the isotropic thermal expansion coefficients of said substrate material,
    said wedge of anisotropic material disposed between said block of chip material and said block of substrate material such that said first surface of said wedge of anisotropic material contacts said chip material and such that said second surface of said wedge of anisotropic material contacts said block of substrate material.

24. The apparatus of claim 23, wherein said integrated optic chip material is silicon.

25. The apparatus of claim 24, wherein said silicon has a thermal expansion coefficient of $2.6 \times 10^{-6}/$ °C.

26. The apparatus of claim 23, wherein said anisotropic material is pyrolytic graphite.

27. The apparatus of claim 26, wherein said pyrolytic graphite has a thermal expansion coefficient of $1 \times 10^{-6}/$ °C. in said first direction, and has a thermal expansion coefficient of $25 \times 10^{-6}/$ °C. in said second direction.

28. The apparatus of claim 23, wherein said anisotropic material is calcite.

29. The apparatus of claim 28, wherein said calcite has a thermal expansion coefficient of $25 \times 10^{-6}/$ °C. in a first direction, and has a thermal expansion coefficient of $-5.8 \times 10^{-6}/$ °C. in a second direction.

30. The apparatus of claim 23, wherein said anisotropic material is crystal quartz.

31. The apparatus of claim 30, wherein said anisotropic material is barium titanate.

32. Apparatus for interfacing a block of integrated optic chip material having isotropic thermal expansion coefficients along all axes to a block of substrate material having isotropic thermal expansion coefficients, comprising:

a wedge of anisotropic material having anisotropic thermal expansion coefficients along two different axes, said anisotropic material having a thermal expansion coefficient in a first direction which is greater than a value of the thermal expansion coefficient of said chip material in a corresponding first direction, and having a thermal expansion coefficient in a second direction which is lesser than a value of the thermal expansion coefficient of said chip material in a corresponding second direction, said wedge of anisotropic material having predetermined angular dimensions such that a first surface of said wedge of anisotropic material has isotropic thermal expansion coefficients which match the magnitude of the isotropic thermal expansion coefficients of said chip material, and such that a second surface of said wedge of anisotropic material has isotropic thermal expansion coefficients which match the magnitude of the isotropic thermal expansion coefficients of said substrate material, said wedge of anisotropic material disposed between said block of chip material and said block of substrate material such that said first surface of said wedge of anisotropic material contacts said chip material and such that said second surface of said wedge of anisotropic material contacts said block of substrate material.

33. The apparatus of claim 32 wherein said integrated optic chip material is silicon.

34. The apparatus of claim 33, wherein said silicon has a thermal expansion coefficient of $2.6 \times 10^{-6}/$ °C.

35. The apparatus of claim 32 wherein said anisotropic material is pyrolytic graphite.

36. The apparatus of claim 35, wherein said pyrolytic graphite has a thermal expansion coefficient of $1 \times 10^{-6}/$ °C. in a first direction, and has a thermal expansion coefficient of $25 \times 10^{-6}/$ °C. in a second direction.

37. The apparatus of claim 32, wherein said anisotropic material is calcite.

38. The apparatus of claim 37, wherein said calcite has a thermal expansion coefficient of $25 \times 10^{-6}/$ °C. in a first direction, and has a thermal expansion coefficient of $-5.8 \times 10^{-6}/$ °C. in a second direction.

39. The apparatus of claim 32, wherein said anisotropic material is crystal quartz.

40. The apparatus of claim 32, wherein said anisotropic material is barium titanate.

* * * * *